United States Patent [19]

Iwashita et al.

[11] 4,015,198

[45] Mar. 29, 1977

[54] SHUTTER-TIME-PREFERENCE SINGLE LENS REFLEX CAMERA WITH AUTOMATIC FILM WIND-UP

[75] Inventors: Tomonori Iwashita, Chofu; Hiroshi Aizawa, Machida; Susumu Kozuki, Yokohama; Masanori Uchidoi, Kawasaki; Tadashi Ito, Yokohama; Yukio Iura, Yokosuka, all of Japan

[73] Assignee: Canon Kabushiki Kaisha, Tokyo, Japan

[22] Filed: Dec. 18, 1974

[21] Appl. No.: 534,151

[30] Foreign Application Priority Data

Dec. 26, 1973 Japan .................... 48-493253
Apr. 15, 1974 Japan .................... 49-4942449

[52] U.S. Cl. .................... 354/29; 354/43; 354/173; 354/234
[51] Int. Cl.² .................... G03B 7/14; G03B 1/18
[58] Field of Search .................. 354/29, 30, 43, 44, 354/234, 235, 170, 173

[56] References Cited

UNITED STATES PATENTS

| | | | |
|---|---|---|---|
| 1,192,710 | 7/1916 | Troxell | 354/235 |
| 3,672,753 | 6/1972 | Nobusawa | 354/43 X |
| 3,754,455 | 8/1973 | Tsujihoto et al. | 354/173 |
| 3,777,637 | 12/1973 | Kuramoto et al. | 354/44 X |
| 3,818,494 | 6/1974 | Tanikoshi et al. | 354/43 X |
| 3,821,769 | 7/1974 | Imura | 354/235 |

Primary Examiner—L. T. Hix
Assistant Examiner—J. A. LaBarre
Attorney, Agent, or Firm—Toren, McGeady and Stanger

[57] ABSTRACT

In a shutter-time-preference single lens reflex camera, in which the shutter time control is done with a predetermined shutter time, and diaphragm value is determined by an output information of a photometric means which measures a transmission light of a photographing lens and the above predetermined shutter time information, a camera actuating means provided in the camera body is put into operation through a magnet means provided in the camera body so that the aperture of the photographing is controlled in accordance with the above predetermined diaphragm value, and then the shutter time control is performed. Further, the camera includes an electric driving device and the driving of the electric driving device is controlled by a safety switch which, in turn, is controlled for its ON and OFF conditions by the completion of the exposure operations such as the operation of the shutter rear screen.

13 Claims, 10 Drawing Figures

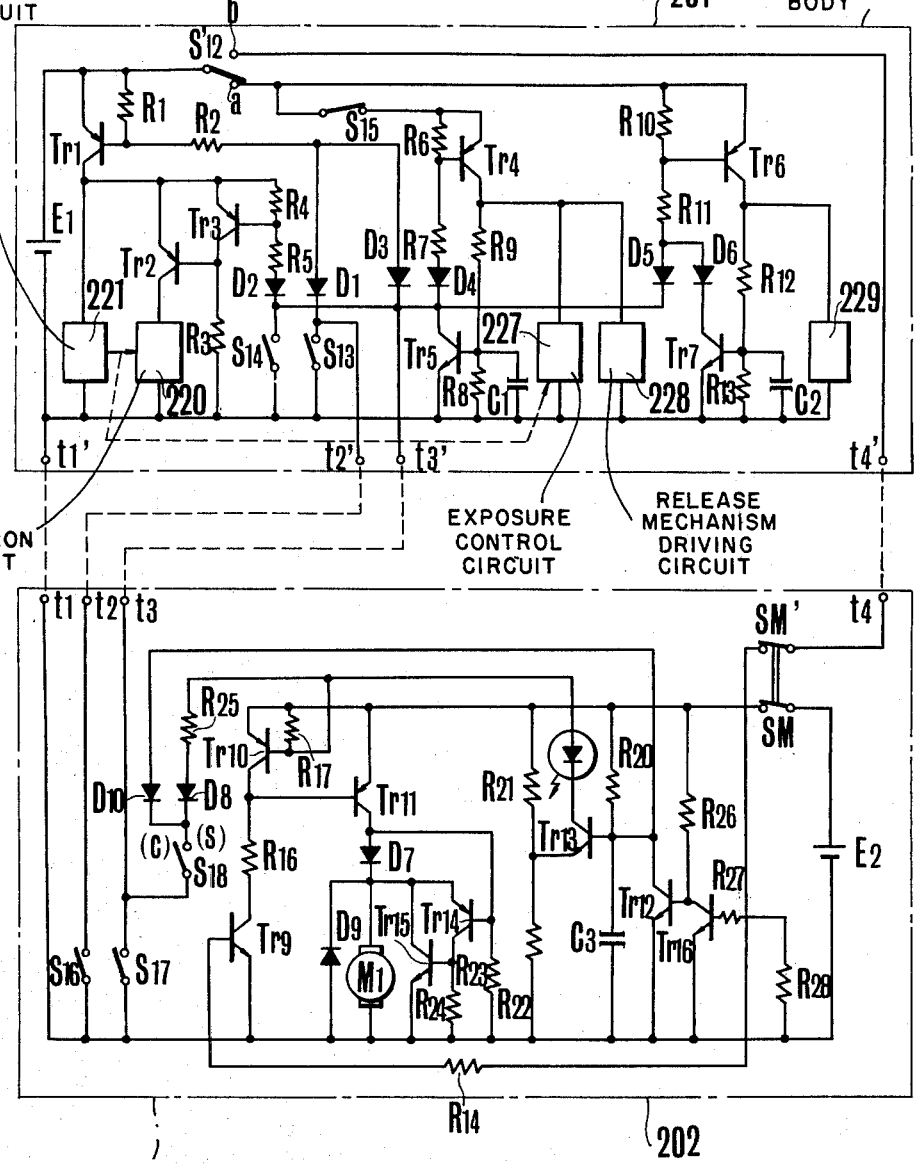

SHUTTER-TIME-PREFERENCE SINGLE LENS REFLEX CAMERA WITH AUTOMATIC FILM WIND-UP

BACKGROUND OF THE INVENTION

1. Field of the Invention

The present invention relates to a shutter-time-perference single lens reflex camera containing a magnet release device.

2. Description of the Prior Art

For a camera which can effect automatic exposure, automatic winding up, automatic photographing, remote photographing, cameramanless photographing, etc., the shutter time preference system is generally adapted for the following reasons (1) and (2).

(1) As the shutter time is constant, more frames can be continuously photographed if the shutter speed is preset at a predetermined time (for example 1/2000 second).

(2) In the case when continuous photographing is to be done with a constant cycle, it is easier to maintain a constant photographing interval because the shutter release time is constant.

However, in the conventional shutter-time-preference cameras, the push-down of the release button is transferred to various members through mechanical association to effect the diaphragm control, mirror-up, running of the front screen etc. Therefore, because of the mecanical transference, the release button has necessarily a long stroke and heavy weight so that shutter oscillation is caused more often and delay in photographing time is caused. Also in the conventional camera, the arrangement of the release button is restricted by the structure of the association mechanism, so that it can not be always arranged in the best position for photographing.

Further, in the case when an electric driving device is attached to the conventional camera, further mechanical association is required, thus causing a complicated structure of the electric driving device due to remote operation, etc. and also the arrangement of the electric driving device is restricted.

Further, in the electric driving device itself, various systems such as a system which detects change in the winding-up torque, a system which detects change in the winding-up speed, and a system which detects the winding-up angle have been used for detecting completion of winding-up action of a shutter charge etc., but these systems all require a single-purpose detecting means (for example, a torque detecting means in the system which detects change in the winding-up torque), and in case of the system which detects change in the winding-up torque or change in the winding-up speed, the detecting means is arranged in the electric driving device, thus requiring a large space. This has been a large problem prohibiting minimization of the size of the electric driving device. On the other hand, in case of the system which detects the winding-up angle, only a contact piece is required as detecting means on the winding-up shaft and the shutter shaft etc. in the camera body and thus it has advantage in simplification of the structure. However, this system has defects that when the winding-up mechanism is stopped during the winding-up action due to absence of the film for example, it is impossible to detect it, so that the winding-up motor is imposed with excessive load and gets out of order, or some structural members of the winding-up mechanism are broken.

Also, when the camera is driven by the electric driving means, means for detecting the completion of exposure is required other than the means for detecting completion of the winding-up action, namely means for producing a signal for starting the winding-up action. In the conventional cameras, means for detecting completion of exposure is provided separately from the means for detecting completion of the winding-up action, and this causes a problem against the minimization of the device size and reduction of production cost.

One of the objects of the present invention is to overcome the above problems, and for this object, a camera starter provided in the camera body is actuated by a magnet means also provided in the camera body, so as to effect diaphragm control as well as shutter control.

Another object of the present invention is to transfer signals between the camera body and the electric driving device without contacts.

Still another object of the present invention is to control opening and closing of the driving circuit of the electric driving device by means of a safety switch controlled by the action of the shutter rear screen.

BRIEF DESCRIPTION OF THE DRAWINGS

FIG. 10 is a modification of the circuit shown in FIG. 9.

DESCRIPTION OF PREFERRED EMBODIMENTS

One embodiment of the present invention will be described referring to the attached drawings.

Figure 1:
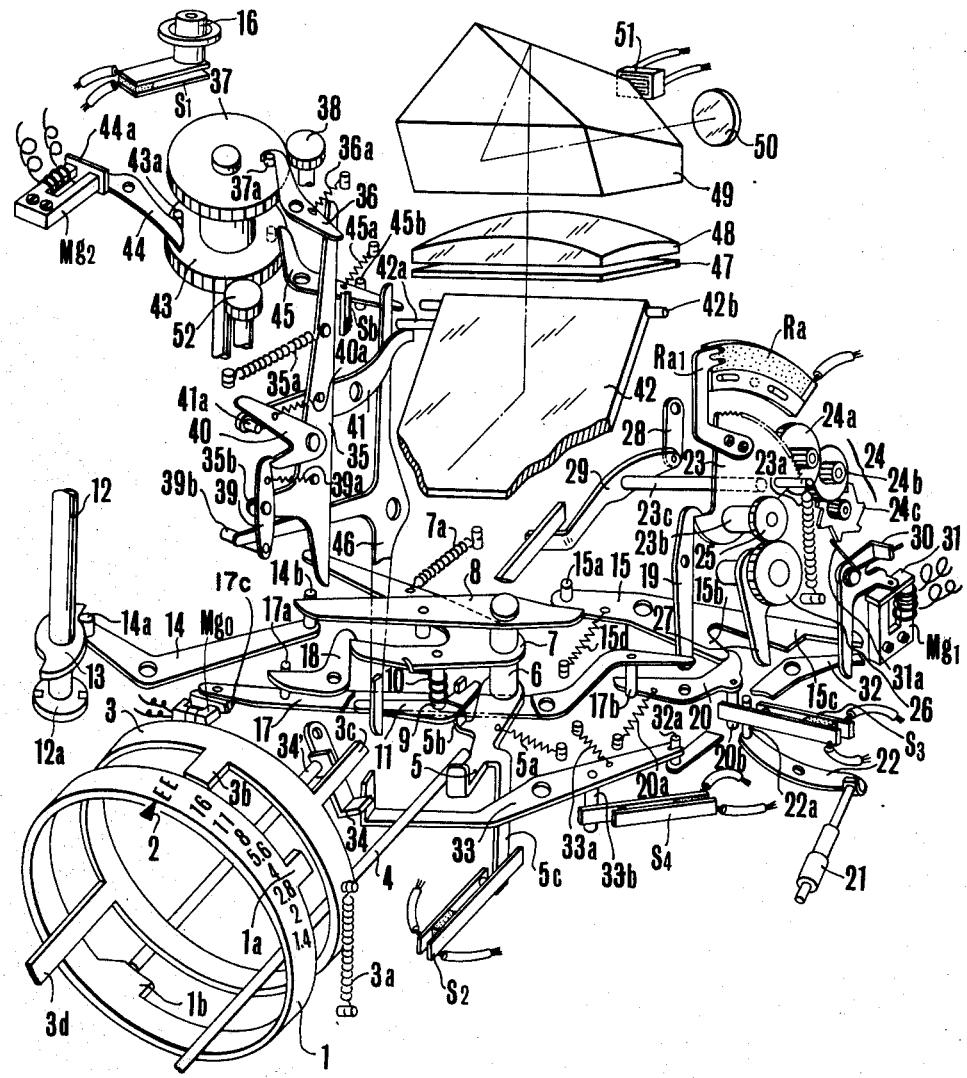
FIG. 1 is a slant view of the inside structure of the camera body according to the first embodiment of the present invention.

In FIG. 1 showing the internal structure of the camera in a state a the completion of film winding-up and shutter charge, 1 is a diaphragm ring provided with EE indications for automatic diaphragm and manual diaphragm, as well as a projection 1a and a cam portion 1b, 2 is an indication for matching the automatic diaphragm EE indications with the manual diaphragms indications. 3 is a preset ring, biassed in a clockwise direction by a spring 3a, and having a projection 3b engageable with a projection 1a of the ring 1. The preset ring 3 is also provided with an arm 3c, and determines the rotation of a bell crank through a diaphgram setting cam ring (not shown) by means of a lever 3d planted on the ring 3, and the bell crank restricts the rotation of a diaphragm driving ring (not shown) to determine the diaphragm aperture. 4 is a pin planted on the diaphragm driving ring, and the end of this pin engages with an automatic diaphragm lever 5 energized in an anti-clockwise direction by a spring 5a. The automatic diaphragm lever 5 has a rising portion 5b and a descending portion 5c with which a movable contact of a hold switch $S_2$ engages. An automatic diaphragm energy storing lever 7 and an intermediate lever 8 are suported by a shaft 6 of the lever 5. The lever 7 is energized in a clockwise direction by a spring 7a and a pin 9 is fixed on the center portion of the lever 7, and this pin 9 is mounted on a common lever 11 by means of a spring 10. one end of the common lever 11 engages with the rising portion 5b of the automatic diaphragm lever 5. 12 is a winding-up shaft of a winding-up lever (not shown), and on this shaft 12 a winding-up cam 13 is fixed and a notched disc plate 12afor engaging with the winding-up shaft of the electric driving device is fixed at the lower portion of the cam 13. 14 is a rotatable intermediate lever provided with at its one end, a pin 14a engaging with the winding-up cam 13, and at the other end, a pin 14b engaging with one end of the intermediate lever. The other end of the intermediate lever 8 is engageable with a pin 15a provided at one end of the charge lever 15. The other end of this charge lever is divided into two and is energized in an anti-clockwise direction by a spring 15d. 16 is a shutter button. By pushing down this button, the magnet for release and a switch $S_1$ for EE magnet are made "on." 17 is a rotatable release lever, and at one end of this lever, an iron piece 17c to be attracted by the release magnet Mgo is attached. Also a pin 17a is planted on the release lever and this pin 17a is engaged with one end of an engaging lever 18 engaged with the energy storing lever 7. The other end of the release lever 17 is engaged with one end of a rotational EE engaging lever 19. Also the other end of the release lever 17 is planted with a pin 17b engaging with one end of a lever 20 rotatable in an anti-clockwise direction by a spring 20a. The pin 20b planted on the other end of the lever 20 engages with a movable contact piece of the memory holding switch $S_3$, and this movable contact piece is engaged with also a pin 22a of a lever 22 which is actuated by an EE lock button 21. The other end of the lever 20 engages with one branch 15b of the charge lever 15. 23 is an EE sector gear energized in a clockwise direction by a spring 23a, and this sector gear 23 is attached to the other end of the lever 19. The sector 23 engages with gears 24a and 24b and a stop wheel 24c constituting a speed control mechanism 24. The sector gear 23 is also attached with a sliding element $Ra_1$ of a variable resistor Ra for determining a preset diaphragm value. The shaft 23b of the sector gear 23 is attached with a gear 25 which is engaged with an EE charge gear 26. The gear 26 is fixed with a lever 27 on its shaft, and this lever 27 contacts the stepped portion of the other branch 15c of the charge lever 15. A pin 23c is planted on the sector gear 23, and the other end of the pin 23c is fixed to the signal lever 29 supported by a supporting lever 28. The bent end of the signal lever 29 stops the arm 3c of the preset ring 3.

$Mg_1$ is a magnet for diaphragm control, which is designed to attract the iron piece 31 attached on the attraction lever 30. The lever 30 is energized in an anti-clockwise direction by a spring 31a, and the bent end of the lever 30 is engageable with a stop wheel 24c of the speed control mechanism 24. The other end of the attraction lever 30 contacts one end of a crank lever 32 for manual operation and the end of one branch of the charge lever 15. The other end of the crank lever is provided with a pin 32a which engages with a recession on one end of a transfer lever 33. This transfer lever 33 is energized in anti-clockwise direction by a spring 33a and stops a movable contact piece of the switch $S_4$ by means of the pin 33b planted on the lever. The bend end of the lever 33 is stopped by the lever 34. A pin 34' is planted on the lens side, and the end face of this pin 34° contacts the cam portion 1b of the diaphragm ring 1. 35 is a mirror driving lever having a delay device (not shown) and this lever is energized in an anti-clockwise direction by a spring 35aand one end of the lever is stopped by the other end of the energy storing lever 7 of the automatic diaphragm energy storing lever 7 while the other end is engageable with one end of a front screen fixing lever 36. This lever 36 is energized in an anti-clockwise direction by a spring 36a and its end engages with the pin 37a planted on a front screen gear 37 engaging with a front screen pinion 38 of a front screen drum (not shown). At the projection 35b of the mirror driving lever 35, a mirror fixing lever 39 is supported. The lever 39 is energized in the clockwise direction by a spring 39a attached to the mirror driving lever 39, and one end of the lever is engaged with a push-up lever 40 supported by the mirror driving lever 35. The push-up lever 40 is energized in the clockwise direction by a spring 40a attached to the mirror driving lever 35. The other end of the lever 40 is engaged with a pin 41a planted on a mirror spring-up lever 41 which engages and stops a spring-up pin 42a provided on a mirror 42 at its other end. The mirror 42 is rotatable around the mirror shaft 42b. 43 is a rear screen gear provided coaxially but separately from the front gear 37. The rear screen gear 43 engages with a rear screen pinion 52 for a rear screen drum (not shown). On the rear screen gear 43, there is planted a pin 43a. 44 is an attraction lever rotated by the pin 43a and this lever 44 is designed to be attracted by a shutter control magnet $Mg_2$ by means of an iron piece 44a of the attraction lever. 45 is a rear screen signal lever rotated by the pin 43a and this lever 45 is held at the position of the stopper pin 45b by a spring 45a. The switch $S_6$ is a switch for rear screen signals which becomes "on" when the rear screen signal lever rotates in the clockwise direction. 46 is a three-branched lever, one end of which is stopped by the other end of the lever 45, the second end of which is stopped by the pin 39b of the mirror fixing lever 39, and the third end of which is stopped by the other end of the common lever 11. The transmission light of the photographing lens (not shown) passes the mirror 42, a focus plate 47, a condenser lens 48 and a pentaprism 49 and reaches an eye-piece 50 and is observed by a photographer. 51 is a light receiving element such as a silicon blue cell.

Figure 2:
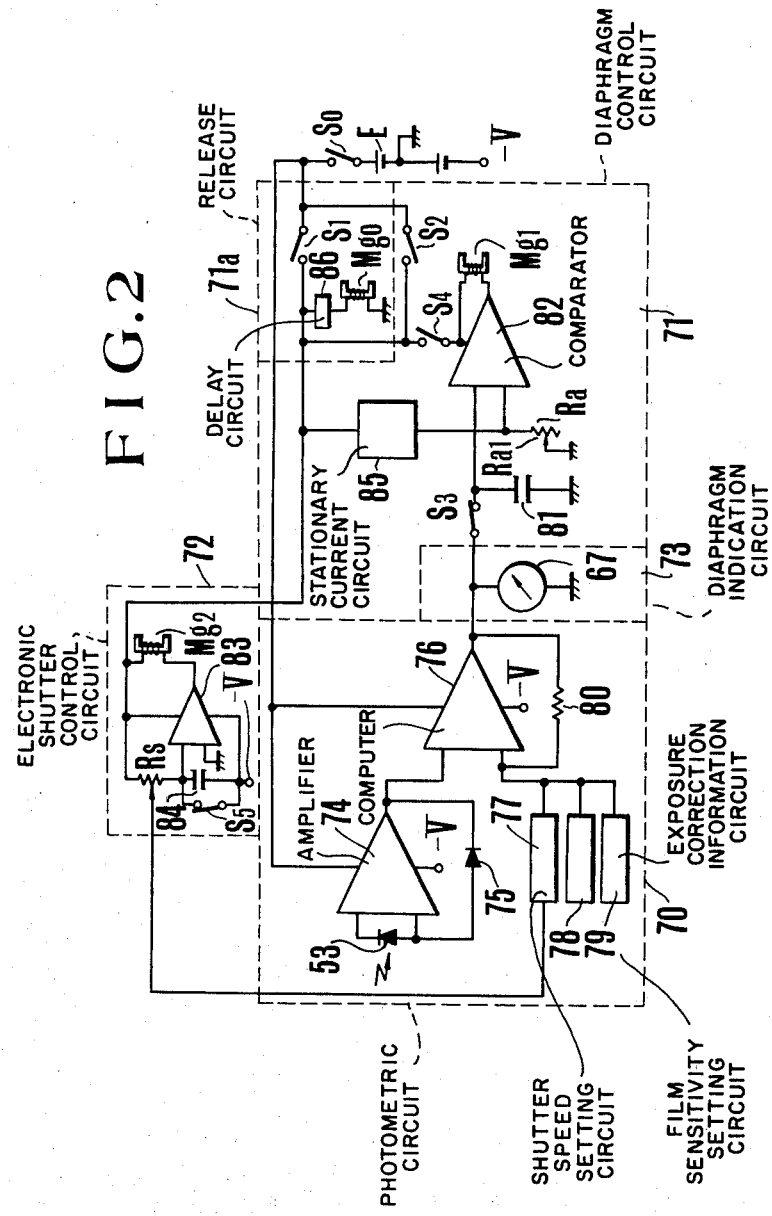
FIG. 2 is an exposure control circuit of the camera shown in FIG. 1.

Now, FIG. 2 shows the exposure control circuit of the camera shown in FIG. 1. The same members as in FIG. 1 are given, the same numerical references. E is an electric power source, to which a photometric circuit 70, a release circuit 71a, a diaphragm control circuit 71 and an electronic shutter control circuit 72 are connected through the power source switch So. Between the photometric circuit 70 and the diaphragm control circuit 71, there is connected a diaphragm indication circuit 73. In the release circuit 71a, a delay circuit 86 is connected in series with the switch $S_1$ and the release magnet Mgo. The delay circuit 86 delays the timing of excitation of the release magnet Mgo so as to effect shutter release after the magnet $Mg_1$ is excited. However, if the delay can be produced by delay of mechanical operation, the delay circuit may be omitted. In the photometric circuit 70, 74 is an amplifier connected to the power source E, and a light receiving element 51 is connected between the first input terminal and the second input terminal of the amplifier 74, a compression log-diode 75 is connected between the output terminal and the second input terminal of the amplifier 74.

The output signal of the amplifier 74 is added to the first input terminal of a computer 76 which performs Apex operation. To the second input terminal of the computer 76, the signal for setting shutter speed from a shutter speed setting circuit 77, the signal for setting film sensitivity from a film sensitivity setting circuit 78 and the signal for correcting exposure from an exposure correction information circuit 79 are added. Between the second input terminal and the output terminal of the computer 76, there is connected a resistor 80. The output signal of the computer 76 is added to a meter 67 functioning as a diaphragm indication circuit 73. Also the output signal of the computer 76 is supplied to the diaphgram control circuit 71 and is added to a condenser 81 and the first input terminal of a comparator 82 through the switch $S_3$. The comparator 82 is connected to the power source E through a switch $S_1$, in which a manual switch $S_4$ and a hold switch $S_2$ are connected in parallel and through the power source switch So. The second input terminal of the comparator 82 is connected to the connecting point between a stationary current circuit 85 and a resistor Ra. Further, the output signal of the comparator 82 functions to control excitation of the magnet $Mg_1$. In the electrical shutter control circuit 72, 83 is a Schmitt circuit connected to the power source E, Rs is a variable resistor which changes its resistance value in correspondence to the shutter speed setting signal of the shutter speed setting circuit 77, and this variable resistor Rs forms a time constant circuit by connecting in series the condenser 84 connected in series with a start switch $S_5$. The contact point between the variable resistor Rs and the condenser 84 is connected to the first input terminal of the Schmitt circuit 83, and the second input terminal of the Schmitt circuit 83 is earthed. The shutter control magnet $Mg_2$ is controlled by the output signal of the Schmitt circuit 83.

The operations of the above structure will be described hereinunder.

Figure 3:
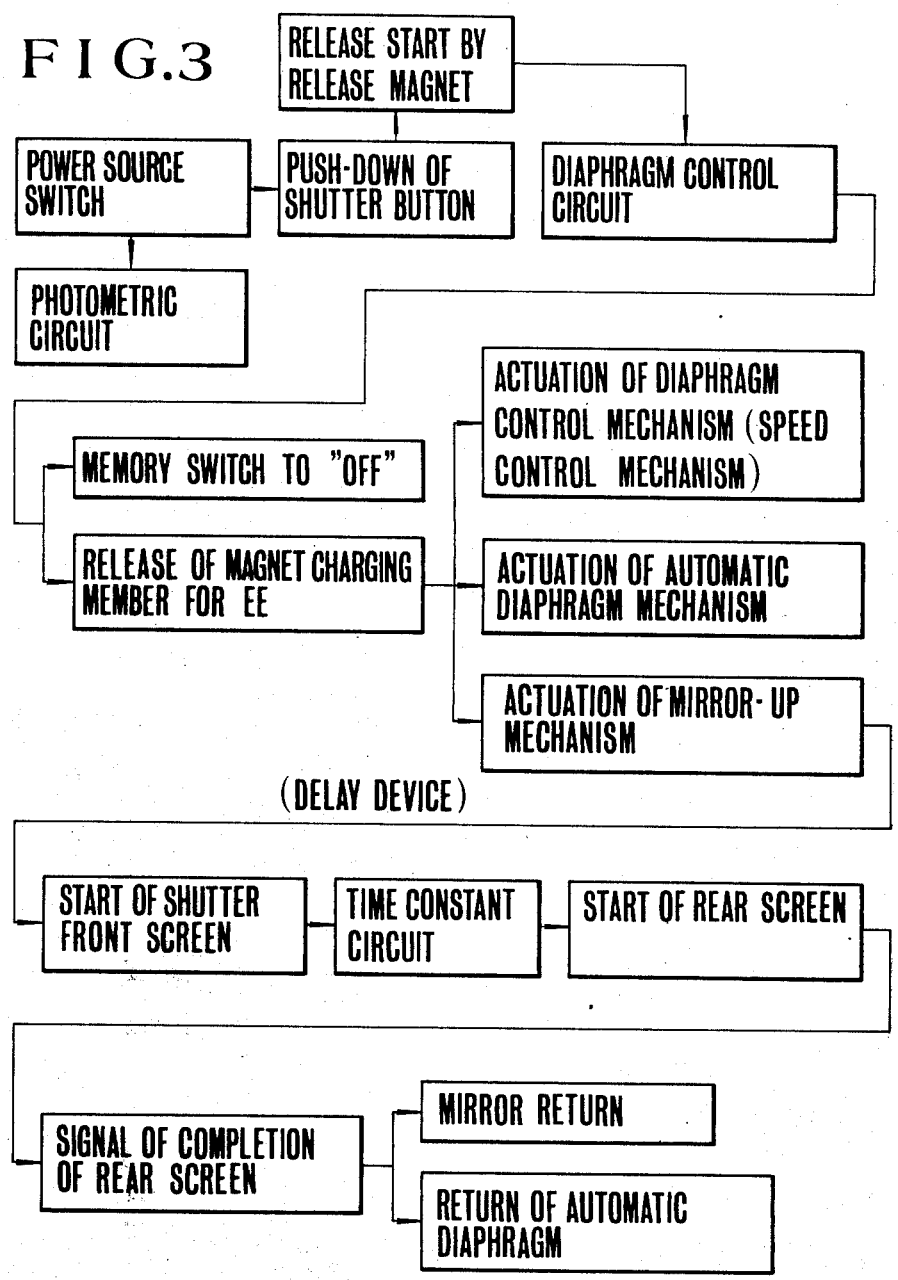
FIG. 3 explains the operation of the camera shown in FIG. 1 and FIG. 2.
Figure 4:
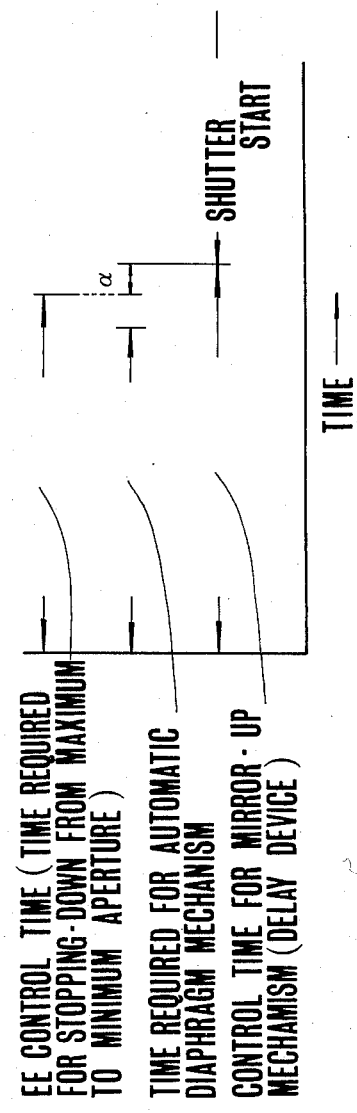
FIG. 4 shows cycles of the shutter start shown in FIG. 3.

First, explanations will be made in case of the shutter preference EE photographing by referring to FIG. 3.

When the EE indication of the diaphragm ring 1 is made to coincide with the indication 2 as shown, the lever 34 is pushed due to the contact between the cam portion 16 and the pin 34a so that the transmission lever 33 rotates in the clockwise direction to turn the manual operation switch $S_4$ "on" and rotates the crank lever 32 in the anti-clockwise direction to release the cramping of the attraction lever 30. Then, when the power source switch So is made "on," the photometric circuit 70 gets into operation. Thus, the transmission light of the photographing lens falls incident on the light receiving element 51. Therefore, an output corresponding to the brightness from the light receiving element 51 is supplied to the first input terminal of the computer 76, through the amplifier 74 and the log-diode 75. Also, the shutter speed setting signal from the shutter speed setting circuit 77, the film sensitivity setting signal from the film sensitivity setting circuit 78 and the exposure correction information signal from the exposure correction information setting circuit 79 are supplied to the second input terminal of the computer 76, and the computer 76 performs Apex operation based on these supplied signals. The output signal of the computer 76 is supplied to the meter 67 of the diaphragm value indication circuit 73 and also supplied to the first input terminal of the comparator 82 as the condenser 81 is charged. Then, when the shutter button is pushed down, the switch $S_1$ gets "on." Thereby the comparator 82 excites the magnet $Mg_1$ with its output, and the Schmitt circuit 83 excites the magnet $Mg_2$ with its output so as to lock the rear screen gear 43. After the switch $S_1$ has became "on," the release magnet Mgo is excited with delay of a certain time caused by the delay circuit 86 to attract the iron piece 17c, so that the release lever 17 is rotated in the anti-clockwise direction. Thereby the lever 20 is rotated in the clockwise direction to turn the switch $S_3$ "off" and memorize and hold the voltage charged in the condenser 81. By the rotation of the lever 20, the charge lever 15 is disengaged with the lever, so that the charge lever 15 is rotated in the anti-clockwise direction and retreats from the position of preventing the rotation of the attraction lever 30 and the lever 27. Also, by the rotation of the release lever 17 in the anti-clockwise direction, the lever 19 is rotated in the anti-clockwise direction to release the engagement with the sector gear 23. Thereby the sector gear 23 is rotated in the clockwise direction by the spring 23a and the preset ring spring 3a. Therefore, the gears 24a, 24b and 24c forming the speed control mechanism 24 rotate to rotate the stop wheel in the anti-clockwise direction. Also by the rotation of the sector gear 23, the sliding element $Ra_1$ of the variable resistor Ra is caused to slide. The change in the resistance value is detected by the comparator 82, and when the value reaches to a predetermined level, the output of the comparator 82 becomes 0 in the current passage to the magnet $Mg_1$ is cut. Thus, the attraction lever 30 is rotated in the anti-clockwise direction by the spring 31a and its bent portion engages with the stop wheel 24c to stop its rotation. In this way, the position of the sector gear 23 is determined. Also, the rotation of the sector gear 23 moves downward, the signal lever 29 by means of the pin 23c, so that the diaphragm preset ring 3 engaging with the signal lever 29 by its arm 3c follows by means of the spring 3a and rotates in the clockwise direction and is stopped.

Therefore, when the sector gear 23 is stopped, the diaphragm preset ring 3 is rotated to a position of proper diaphragm value, thereby determining the position of the bell crank. In other words, the stop position of the diaphragm preset ring 3 is a diaphragm value which is determined by the informations from the light receiving element 51 measured through the photographing lens, the preset shutter speed film sensitivity and exposure correction informations. On the other hand, along with the stat of the EE operations as above, the automatic diaphragm mechanism starts also.

Thus, when the release lever 17 is rotated in the anti-clockwise direction due to the excitation of the release magnet, the automatic diaphragm stopper pin 18 is rotated in the anti-clockwise direction by means of the pin 17a. Therefore, the automatic diaphragm energy storing lever 7 is rotated in the anti-clockwise direction, so that the common lever 11 rotates in the clockwise direction to rotate the automatic diaphragm lever 5 in the clockwise direction. Therefore, the hold switch $S_2$ is made "on " and the pin 4 planted on the diaphragm driving ring is actuated so as to effect stopping-down in correspondence to the position of the bell crank in which the diaphragm has been preset.

Also by the rotation of the automatic diaphragm energy storing lever 7 in the clockwise direction, the mirror driving lever 35 is rotated in the anti-clockwise direction by the spring 35a, so that the mirror spring-up lever 41 is rotated in the anti-clockwise direction by the coaxial push-up lever 40, and in this way the mirror 42 is sprung up. Along with the spring-up of the mirror 42, the delay device (not shown) starts to operate to rotate the front screen cramping lever 36 in the clockwise direction by the mirror driving lever 35 after a delay of time caused by the delay device. The delay time caused by the delay device such as to start the shutter after the lapse of time from the maximum diaphragm to the minimum diaphragm. Thus, the front screen gear 37 starts to rotate and run the front screen by means of the front screen pinion 38. By the running of the front screen, the start switch $S_5$ is made "off" according to a conventional method and the Schmitt circuit 83 turns "off" to bring the magnet $Mg_2$ into non-excitated state after the time determined by the variable resistor Rs having a resistance value corresponding to the preset shutter speed. Thus, the lock of the rear screen gear 43 by the attraction lever 44 is released and the rear gear 43 starts to rotate to run the rear screen by means of the rear screen pinion 52.

Also at the completion of the running of the rear screen, the rear screen signal lever 45 is rotated in the clockwise direction by the pin 43a along with the rotation of the rear screen gear 43, so that the three-branched lever 46 is rotated in the anti-clockwise direction and the switch $S_6$ is made "on." The rotation of the three-branched lever 46 pushes down the lever 39 and the lever rotates in the anti-clockwise direction to release the engagement with the push-up lever 40. The push-up lever 40 rotates in the clockwise direction by means of the spring 40a and the mirror spring-up lever 41 and the mirror 42 return to their original positions by means of the return springs (not shown). Also the rotation of the three-branched lever 46 rotates the common lever 11 in the clockwise direction and retreats from the rising portion 5b of the automatic diaphragm lever 5. As a result, the automatic diaphragm lever 5 rotates in the anti-clockwise direction by means of the spring 5a and the pin 4 planted on the diaphragm driving ring restores to its original free state. Then when the winding operation is done by means of the winding shaft 12, the film winding up as well as the shutter charge are effected, and the charge lever 15 is charged through the intermediate levers 14 and 8, and also the automatic diaphragm mechanism and the mirror mechanism are charged, so that the members released by the above releasing operations are again engaged to restore to the state as shown.

Also, when the EE lock button 21 is pushed down, the switch $S_3$ is maintained "off" by means of the lever 22, so that subsequent photographing can be done with the first memorized value of the condenser 81.

Next, descriptions will be made for the manual operations. First, when a desired diaphragm value of the diaphragm ring 1 is made to coincide with the indication 2, the transmission lever 33 rotates in the anti-clockwise direction because the pin 34a is disengaged with the cam portion 1b, so that the manual switch $S_4$ is made "off" and the crank lever 32 is rotated in the clockwise direction to perform the cramp of the attraction lever 30. Then, when the power source switch So is made "on," the photometric circuit 70 is brought into operation just as in the case of the shutter preference, and when the shutter button shaft 16 is pushed down, the switch $S_1$ is made "on." In this way, the Schmitt circuit 83 excites the magnet $Mg_2$ with its output and locks the rear screen gear 43. At this time, the diaphragm control circuit 71 does not get into operation because the switch $S_4$ is "off." Also, when the switch $S_1$ is made "on," the release magnet Mgo is excited with delay of a certain time caused by the delay circuit 86 to attract the iron piece 17c, so that the release lever 17 rotates in the anti-clockwise direction. Thereby, the lever 20 rotates in the clockwise direction to release the engagement with the charge lever 15, so that the charge lever 15 rotates in the anti-clockwise direction and retreats from the position of preventing the rotation of the lever 27. Also the rotation of the release lever 17 in the anticlockwise direction rotates the lever 19 in the anticlockwise direction to release the engagement with the sector gear 23. In this way, the sector gear 23 rotates in the clockwise direction by means of the spring 23a and moves downward the signal lever 29 by means of the pin 23c, so that the diaphragm preset ring 3 engaged with the signal lever 29 by its arm 3c rotates to the position of the projection 1a of the diaphragm ring 1 by means of the spring 3a. Thereby, the diaphragm preset ring 3 is rotated to the position of a preset diaphragm value, thus determining the position of the bell crank.

Along with the rotation of the release lever 17 in the anti-clockwise direction, the automatic diaphragm mechanism starts. The automatic diaphragm engagement lever 18 is rotated in the anti-clockwise direction by the rotation of the release lever 17, so as to effect stoppingdown of the diaphragm just as in the case of the shutter preference and to effect spring-up of the mirror, and the shutter is started. After the shutter control, the restoration of the mirror 42 and the automatic diaphragm lever 5 is effected in a similar way as in the case of the shutter preference.

Figure 5:
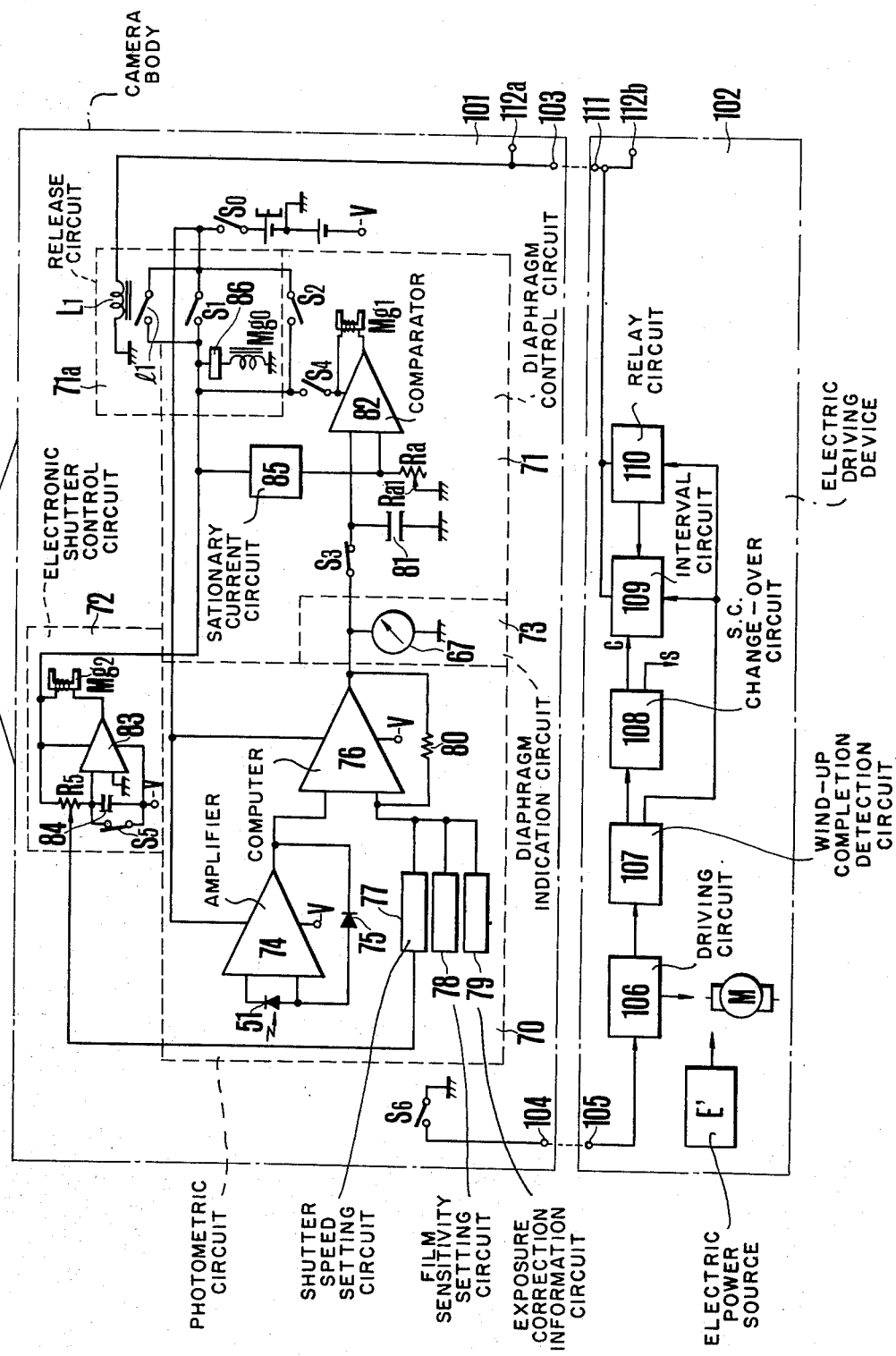
FIG. 5 is a circuit in which the circuit of the electric driving device is connected to the circuit shown in FIG. 2.

FIG. 5 shows the circuit for the camera shown in FIG. 1 attached with the electric driving device as an attachment unit. In FIG. 5, 101 is the camera body, and 102 is the electric driving device for performing the electric photographing. The circuit in the camera body is similar as in FIG. 2, but it has a terminal 103 for receiving the release starting signal, and the terminal 103 is earthed through a relay $L_1$. A switch $l_1$ which is actuated by the relay $L_1$ is connected in parallel with the switch $S_1$, and a terminal 104 for sending a signal of the completion of photographing is connected to one end of the switch $S_6$. A terminal 105 within the electric driving device 102 is a terminal for receiving the signal of the completion of photographing, so arranging to be connected to the terminal 104 on the camera side. 106 is a driving circuit for film winding-up, which transmit the driving force of the motor M to a winding coupler 12a on the camera side by means of a train of gears and a hydraulic device etc. 107 is a circuit for detecting completion of the winding-up, which detects the completion of the film winding-up by means of a known detecting means (for example, detection of changes in the torque of the winding shaft, detection of changes in the speed of the winding shaft, and detection of changes in the motor current). 108 is a S.C changeover circuit, which detects whether the setting of the electric driving device is for a single-frame photographing (S) or a continuous photographing (C), and if it is S the operation is stopped and if it is C the signal, is sent to the next circuit. 109 is an interval circuit and functions as a circuit for determining the photographing cycle when a continuous photographing is done with a constant cycle. 110 is a relay circuit on the side of the electric driving device, and produces a signal for starting the release when the relay button of the electric driving device is made "on." The terminal 111 is arranged, so as to be connected to the terminal 103 on the camera side and produces a signal for starting the release. 112a and 112b are terminals for receiving the release starting signal from other attached units. E' is an electric power source of the electric driving device.

Figure 6:
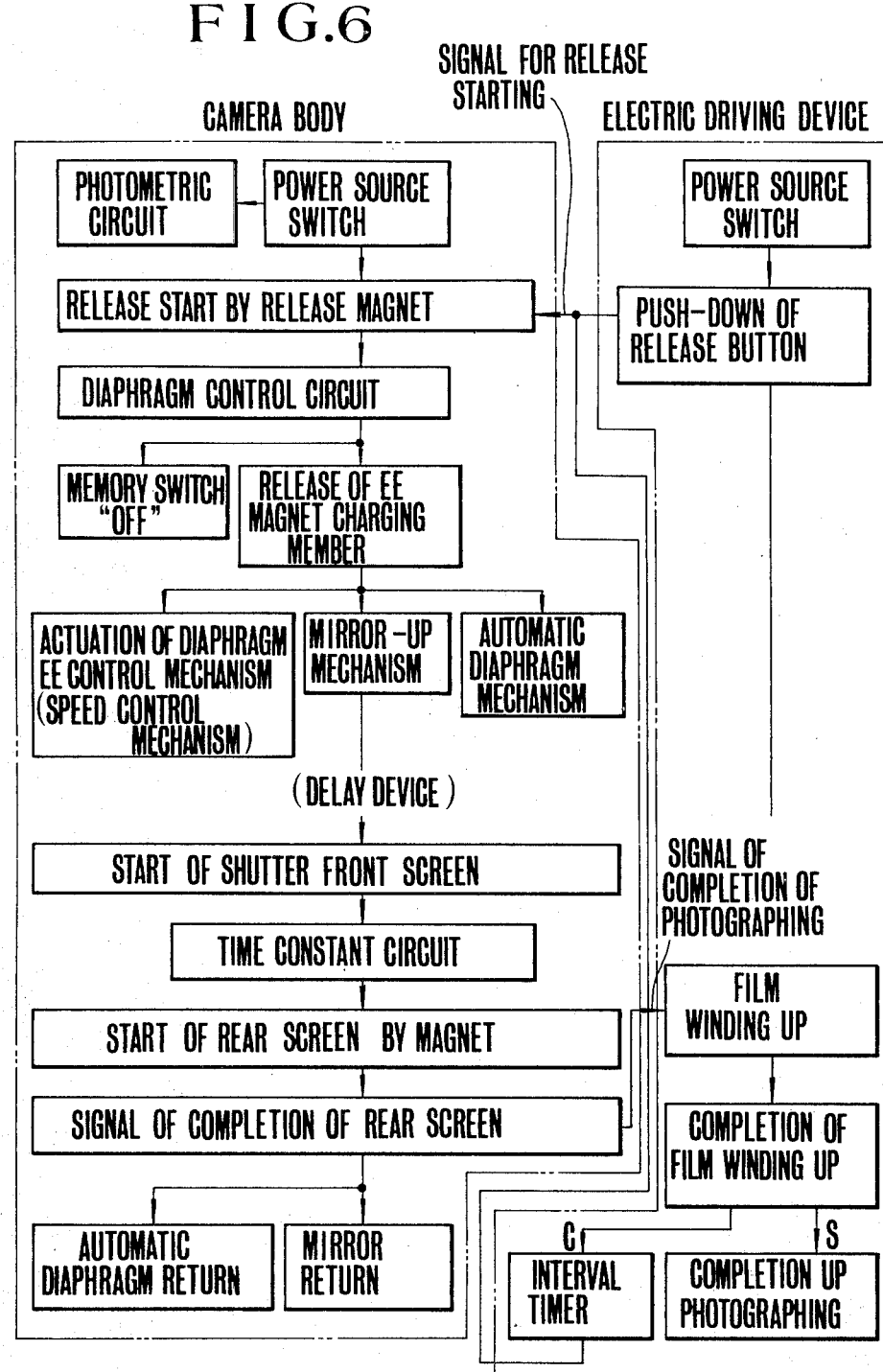
FIG. 6 explains operations of the circuit shown in FIG. 5.

Explanations will be made on the operations of the circuit shown in FIG. 5 referring to FIG. 6.

In the camera in a state where the film winding-up and the shutter charge have been completed, as shown in FIG. 1, when the release button of the electric driving pushed down, the release circuit 110 within the electric driving device is made "on" and send a signal for starting the release and reset the interval timer circuit 109 to its initial state. The signal for starting the release is a positive pulse, and its pulse width corresponds to the time from the excitation of the magnet Mgo to attract the lever 17 in the camera body to the turning "on" of the hold switch $S_2$. As the positive pulse is sent to the relay $L_1$ through the terminals 103 and 111, the relay $L_1$ maintains the switch $l_1$ on for the time determined by the pulse width. On the camera side, as the switch $l_1$ connected in parallel to the switch $S_1$ is made "on" in stead of the switch $S_1$, the release circuit 71a and the diaphragm control circuit 71 are made "on" and thus the shutter release is started in a similar way as in the case of FIG. 1 to FIG. 3. Since the switch $l_1$ is maintained "on," only for the time corresponding to the pulse width of the release starting signal, the switch $l_2$ is made "off," when the hold switch $S_2$ is made "on," so that the release magnet Mgo is de-excited to save waste consumption of the electric power. When the photographing of the first frame is completed by the operations similar to those in case of FIG. 1 to FIG. 3, the switch $S_6$ is made "on." Then the signal of completion of photographing is input to the film winding driving circuit 106 through the terminals 104 and 105. The driving circuit 105 is made "on" to rotate the motor M and the driving force of the motor is transferred to the notched disk plate 12a of the winding coupler on the camera side through a train of gears (not shown) to effect the film winding-up and the shutter charge. When the film winding-up is completed, a conventional detecting means for completion of the winding-up, such as by detecting the change in the torque of the winding shaft is actuated to send the signal of winding-up completion to the circuit 107. Then circuit 107 turns "on" and resets the release circuit 110 and the interval timer circuit 109 to their initial state and send signals to the S.C change-over circuit 108. Then the S.C change-over circuit is made "on" and complete all operations according to the signal S in case of a single-frame photographing, and sends signals to the interval timer circuit 109 according to the signal C in case of the continuous photographing. The interval timer circuit 109, which has received the signal make counting only for the time necessary for assuring a predetermined photographing cycle (time obtained by subtracting the release time and the winding time from the photographing cycle), and produces the release starting signal at a predetermined time. The release starting signal is sent to the camera side through the terminals 103 and 111, and the release is done again. By repeating the above operations, the camera repeats the release and the winding. Meanwhile the starting of the counting by the interval timer may be done by the release starting signal, and in this case, the counting time by the interval timer corresponds strictly to the photographing cycle.

Figure 7:
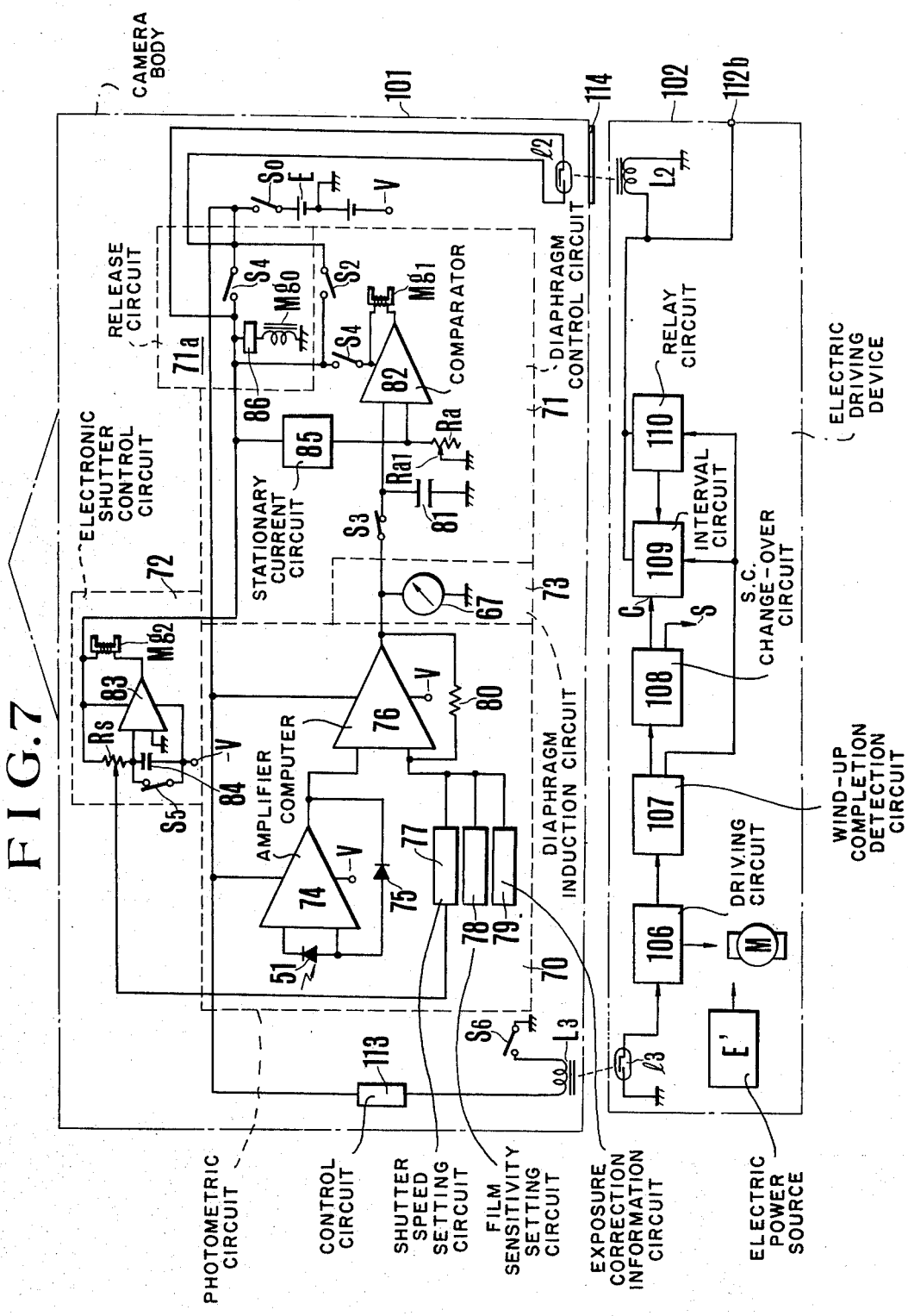
FIG. 7 is a modification of the circuit shown in FIG. 5.

FIG. 7 shows a modification of the circuit shown in FIG. 5, in which the sending and receiving of the signals is done by means of a lead switch in stead of connecting the electric driving device with the camera body.

In FIG. 7, for transmitting the release starting signal, a lead switch $l_2$ is connected in parallel to the switch $S_1$ in stead of the relay $L_1$, the switch $l_1$ and the terminal 103. On the side of the electric driving device, a magnet $L_2$ in stead of the terminal 111 is connected at a position opposing to the lead switch and one end of the magnet is earthed. Also for transmitting the signal of completion of photographing, a magnet $L_3$ in stead of the terminal 104 is connected, and one end of the magnet is connected to the switch So through the control circuit 113. The control circuit 113 is set so as to excite the magnet $L_3$ instantaneously by turning the switch "on." On the side of the electric driving device, a lead switch $l_3$ in stead of the terminal 105 is connected at the position opposing to the magnet $L_3$, and one end of the switch is earthed. The lead switches $l_2$, $l_3$ are so set that they turn "on" in correspondence to the intensity of the magnetic field.

Descriptions will be made on the operations for sending and receiving of the release starting signal and the photographing completion signal.

When a positive pulse of the release starting signal is generated by the release circuit or by the interval timer circuit on the side of the electric driving device, the magnet $L_2$ is excited for the time determined by the pulse width. When the magnet $L_2$ is excited, the magnet field near the lead switch $l_2$ is intensified sharply so that the lead switch $l_2$ becomes "on" and the same state as in FIG. 5 where the switch $l_1$ becomes "on" is obtained and thus the camera starts the release.

Then, when the first frame of the film is photographed, the switch $S_6$ becomes "on," in a similar way as in FIG. 5, and when the switch $S_6$ becomes "on," the magnet $L_3$ is excited for instance. By the excitation of the magnet $L_3$, the magnetic field near the lead switch is intensified sharply, so that the lead switch becomes "on" for instantaneously, and inputs the signal of completion of photographing to the film winding-up driving circuit. The subsequent operations are similar as in case of FIG. 5.

As explained above, the use of a lead switch and a magnet makes it possible to effect contactless connection of the camera body and the electric driving device. It is also possible that a semi-conductor such as a magnet-diode which corresponds to the intensity of the magnetic field is used in stead of the lead switch. In the above embodiment, 114 is a member for shielding the magnetic field, which is attached at a position opposing to the lead switch in the camera and contributes to prevent the switch $l_2$ from turning "on" due to the noise in case when the camera is used without the electric driving device 102.

The second embodiment of the present invention will be described referring to FIGS. 8 – 10.

201 is the camera body, 202 the electric driving device, 203 to 208 reprepresent an optical system for a single lens reflex camera, 203 is a photographing lens, 204 is a diaphragm, 205 is a mirror, 206 is a condenser lens, 207 is a penta prism, 208 is an ocular lens, 209 is a light receiving element arranged at the ocular section, 210 is an indication means such as an emission diode for finder indication, which indicates the shutter speed, photographing diaphragm etc.

211 to 217 represent componenent members of the main portion of a focal plane shutter of the single lens reflex camera, 211 is a shutter front screen, 212 is a shutter rear screen, 213 is an aperture portion, 214 is a spring for running the front screen, 215 is a spring for running the rear screen, 216 is a lever for cramping the front screen, and 217 is a lever for cramping the rear screen.

$S_{11}$ is a switch for starting the count of an electronic shutter which associates with the running of the front screen, $S_{12}$ is a safety switch which is maintained "on" from the completion of the rear screen charge to the running of the rear screen. $Mg_{11}$ is a magnet for the running of the rear screen, 218 is a release button of the camera body, $S_{13}$ is a switch for photometry and indication which is made "on" by the first stroke of the release button 218, $S_{14}$ is a switch for exposure control and shutter release, which is made "on" by the second stroke of the release button 218. 219 is a circuit which inclues an indication circuit 220, a photometry circuit 221 and a shutter release circuit, and is connected directly to the electric power source $E_1$. 223 is a shutter speed information source, which is manually set, and 224 is a film sensitivity information source. The informations from these sources are input to the photometric circuit 221. 225 is a circuit which includes a self-hold circuits 226, 226' as switching means, an exposure control circuit 227, release mechanism driving circuit 228 and a shutter time control circuit 229, and is connected to the power source E' in the camera body through the safety switch $S_{12}$. Therefore, the photometric circuit 221 and the indication circuit 220 can be made "on" at any phase of the camera by push-down of the release button 218, while the exposure control circuit 227, the release mechanism driving circuit 228, and the shutter time control circuit 229 can be made "on" only while the safety switch $S_{12}$ is "on," namely, for the time from the completion of the charging of the shutter rear screen 212 and the running of the rear screen. $Mg_{12}$ is a release magnet, which controls the driving of the diaphragm 204, the rising of the mirror 205, and the running of the front screen. 230 to 233 represent a circuit within the electric driving device, where 230 is a release circuit, 213 is a switching circuit, 232 is a delay circuit and 233 is a brake circuit.

$E_2$ is an electric power source of the electric driving device, $M_1$ is a motor which performs actions such as shutter charging and film winding-up, and is controlled in its turning "on" and "off" by the switching circuit 231.

The functional operations of the above structure will be described hereinunder. The camera body 201 and the electric driving device 202 are supposed to be in a state of winding completion. First, when the switch $S_{13}$ is made "on" by the first stroke of the release button 218 on the camera side, the circuit 219 turns "on" and the circuit components start their operations. Namely, the photometric circuit 221 performs photometry on the basis of the object brightness, shutter speed and film sensitivity informations from the shutter speed information source 223 and the film sensitivity information source 224, and sends the outputs, namely the informations such as of diaphragm value, shutter speed to the indication circuit 220. The indication circuit 220 indicates by means of the indication means 210, the diaphragm value shutter speed, etc. in a finder according to the outputs from the photometric circuit 221. Then when the switch $S_{14}$ is made "on" by the second stroke of the release button 218, the circuit 225 turns "on" (at this time, as the camera is in the winding completion state, the shutter is charged and thus the safety switch $S_{12}$ is "on"). In the circuit 225, the self-hold circuits 226 and 226' start their operations and maintain the circuit 225 "on" until the exposure is completed even if the switch $S_{14}$ becomes "off" due to the release of push-down of the release button. Simultaneously, the exposure control circuit 227 starts operation and preset the diaphragm 204 to a proper diaphragm value determined by the photometric circuit 221. Meanwhile, in synchronism with this, the release mechanism driving circuit 228 also starts operation to stop down the diaphragm 204 to the preset diaphragm value by turning the release magnet $Mg_{12}$ "on" and to raise the mirror 205, and then rotates the front screen cramping lever 216 around the shaft 216' in the clockwise direction to liberate the front screen from the lever 216.

Thereby, the shutter front screen 211 runs in the direction contrary to the arrow mark A in the drawing by the action of the spring 214. When the shutter front screen 211 starts running, the shutter time control circuit 229 starts counting of the time according to the signal from the count starting switch $S_{11}$. As the shutter time control circuit has been previously input with the present shutter speed informations from the shutter speed information source 223, it counts only the predetermined shutter time and when the counting is completed, it turns "on," the magnet $Mg_{11}$ for the running of the rear screen. Upon the turning "on" of the magnet $Mg_{11}$, the rear screen cramping lever 217 rotates around the shaft 217' in the clockwise direction, and the shutter rear screen 212 runs in the contrary to the arrow mark A by the action of the spring 215 to complete the exposure and the safety switch $S_{12}$ turns "off." When the safety switch $S_{12}$ turns "off," the circuit 225 also turns "off," and at this time, the signal of the safety switch $S_{12}$ is transferred to the switching circuit 231 in the electric driving device to make the switching circuit 231 "on" and the signal is transferred to the delay circuit 232 and the circuit is caused to start the counting of the predetermined time. (At this time, the delay time to be set in the delay circuit 232 must be somewhat longer than the time required by the ordinary winding. Thus, supposing that the time required by the winding varies between 150 ms and 300 ms depending on the voltage variation of the power source $E_2$ in the electric driving device, it is necessary that the delay time in the delay circuit 232 is set to about 500 ms.)

When the switching circuit 231 becomes "on," the motor $M_1$ starts rotation to move the shutter front screen 211 and the shutter rear screen 212 in the direction of the arrow A, so as to effect the shutter charge and the winding such as film winding. When the winding operation is completed, the shutter charge is also completed, so that the safety switch $S_{12}$ becomes "on,"

and the switching circuit 231 is made "off" by the signal of the switch to cut the current to the motor $M_1$ and the motor is braked by the brake circuit 233 and stops at once.

By repeating the above operations, the electric driving of the camera is performed.

In case when the winding is effected normally, as the delay time of the delay circuit 232 is set to be somewhat longer than the time required by the winding as mentioned above, the switching circuit 311 becomes "off" according to the signal at the time when the safety switch $S_{12}$ becomes "on," and the motor $M_1$ is stopped by the brake circuit 233. But during the winding, when the winding mechanism stops due to absence of the film, for instance, the safety switch $S_{12}$ does not become "on," even if the delay time set in the delay circuit 232 has lapsed. And thus the switching circuit 231 is maintained "on" and the current to the motor $M_1$ is not cut. In such a case, the switching circuit 231 is designed so as to be changed over by the output signal after the count of the predetermined time of the delay circuit 232 and the current to the motor $M_1$ is cut.

Figure 8:
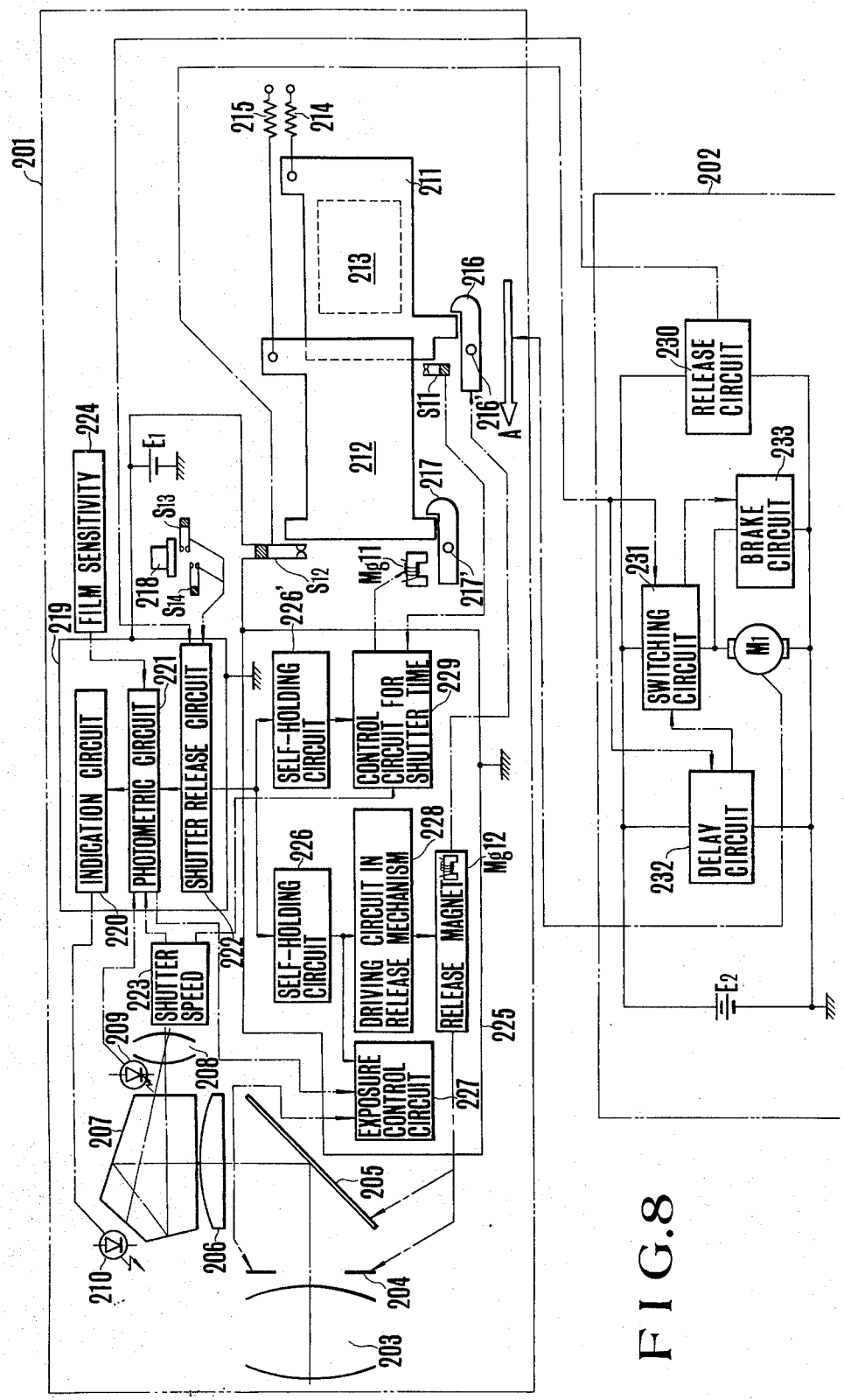
FIG. 8 relates to the second embodiment of the present invention, and shows schematically the main portion of the camera body and the electric driving means.
Figure 9:
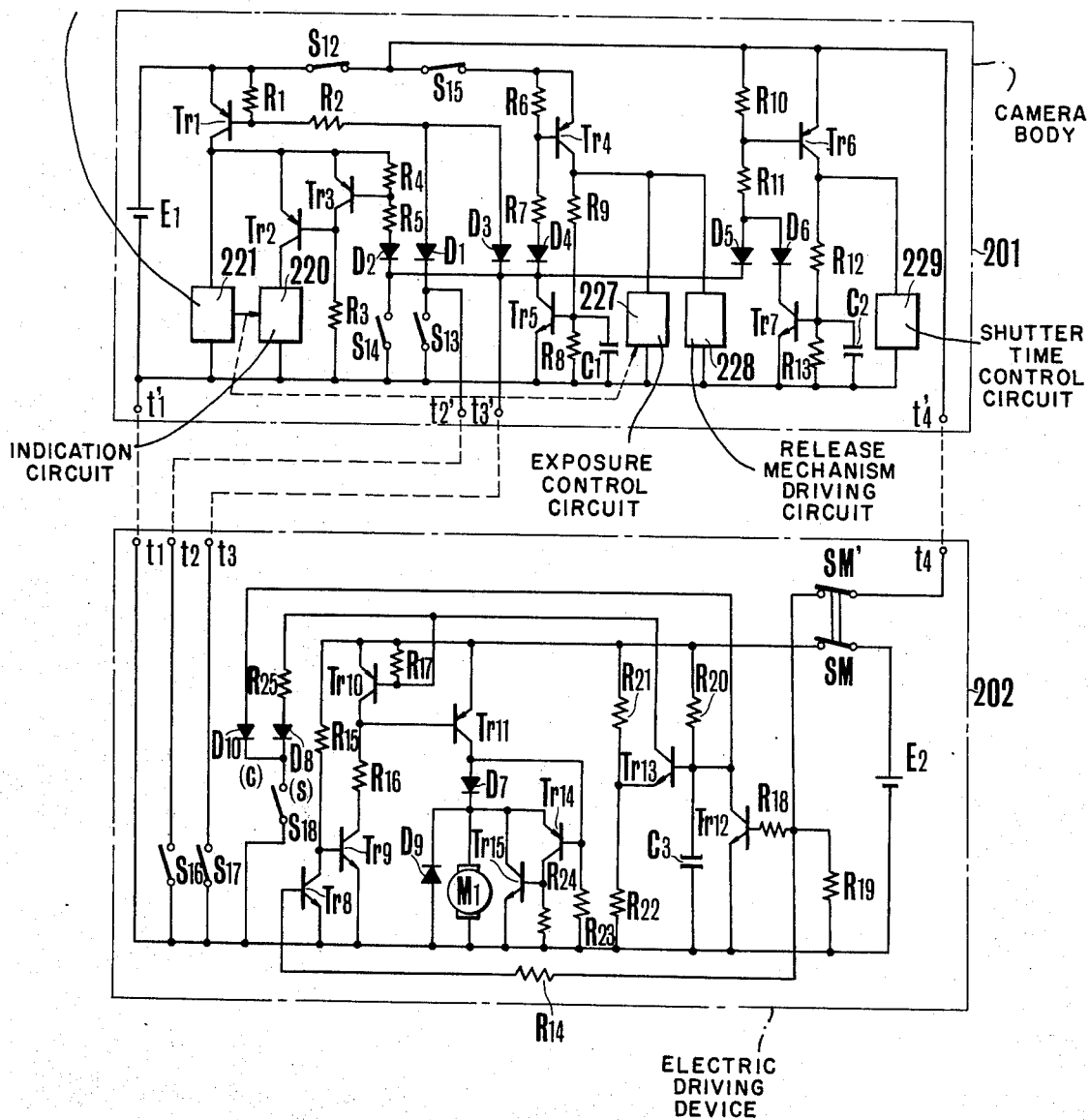
FIG. 9 shows more specifically the circuit shown in FIG. 8.

FIG. 9 shows a specific embodiment of the electric circuit shown in FIG. 8. The same numerical references as in FIG. 8 represent the same components having the same functions as in FIG. 8.

As for the structure of the circuit, $S_{15}$ is a switch which becomes "on" at the completion of the winding, and becomes "off" when the shutter front screen 11 runs, $S_{16}$ is a switch for photometry and indication on the side of the electric driving device. $S_{17}$ is a switch for shutter release, $S_{18}$ is a switch for changing over between a continuous photographing (C) and a single frame photographing, SM is a main switch of the electric driving device, and SM' is a switch which operates in association with the switch SM. The shutter release circuit 222 in the camera body 201 shown in FIG. 8 is constituted by switches $S_{13}$, $S_{14}$ and diodes $D_1$ to $D_5$, the self-hold circuit 226 is constituted by transistors $Tr_4$, $Tr_5$, resistors $R_6$ to $R_9$ and a condensor $C_1$ and the self-hold circuit 226' is constituted by transistors $Tr_6$, $Tr_7$, resistors $R_{10}$ to $R_{13}$ and the condensor $C_2$, as shown. Also, the release circuit 230 in the electric driving device 202 in FIG. 8 is constituted by switches $S_{16}$ and $S_{17}$, the switching circuit 231 is constituted by transistors $Tr_0$ to $Tr_{11}$ and $Tr_{13}$, resistors $R_{15}$ to $R_{17}$, $R_{21}$ and $R_{22}$, the delay circuit 232 is constituted by a transistor $Tr_{12}$, resistors $R_{18}$ to $R_{20}$ and the condensor $C_3$, and the brake circuit 233 is constituted by transistors $Tr_{14}$, $Tr_{15}$, resistors $R_{23}$, $R_{24}$ and a diode $D_7$ as shown. $t_1$ to $t_4$ are respectively a contact terminal of the electric driving device 202, which is connected to terminals $t'_1$ to $t'_4$ respectively on the camera body side. The terminal $t_1$ corresponds to the earth in FIG. 8.

Explanations will be made on the functions of the above electric circuit, on the assumption that the camera is in the state of winding completion (both the switches $S_{12}$, $S_{15}$ are "on"). When the switches SM and SM' in the electric driving device are made "on" and then the switch $S_{15}$ in the camera body or the switch $S_{16}$ in the electric driving device 202 is made "on," the base current of the transistor $Tr_1$ flows (in case when the switch $S_{16}$ is made "on," it flows through the terminals $t'_2$, $t_2$ and the switch terminals $t_1$, $t'_1$.), and when the transistor $Tr_1$ becomes conductive, current is passed to the photometric circuit 221, which then starts photomeasuring on the basis of the object brightness, shutter speed and film sensitivity informations.

Meanwhile, when the transistor $Tr_1$ becomes conductive, the transistor $Tr_2$ too becomes conductive, and thereby the indication circuit 220 becomes "on," so that the output of the photometric circuit 221, namely the indication means 210 in FIG. 8 performs indication. Then when the switches $S_{14}$ to $S_{17}$ are made "on," a base current of the transistor $Tr_3$ flows (in case when the switch $S_{17}$ is made "on," it flows through the terminals $t'_3$, $t_3$ and the terminals $t_1$, $t'_1$) and the transistor $Tr_3$ becomes conductive, so that the indication circuit 220 becomes "off" and simultaneously the base current of the transistor $Tr_4$ flows (through the same course as in case of the transistor $Tr_3$ because both the switches $S_{12}$ and $S_{13}$ are "off"). By the conductivity of the transistor $Tr_4$, the transistor $Tr_3$ becomes "on" and exerts a self-holding effect irrespective to the "on" and "off" of the switches $S_{14}$ and $S_{17}$, and simultaneously the exposure control circuit 227 and the release mechanism driving circuit 228 become "on." Further, at this time, the transistor becomes conductive (similarly as the transistor $Tr_4$) and thereby the transistor $Tr_7$ becomes "on" and exerts self-holding effect irrespective to the "on" and "off" of the switches $S_{14}$ and $S_{17}$, and simultaneously the shutter time control circuit 229 becomes "on." The exposure control circuit 227 presets the diaphragm to a proper diaphragm value determined by the photometric circuit 221 as explained in connection with FIG. 8. Also the release mechanism driving circuit, 228 stops down the diaphragm to a preset diaphragm value by means of the release magnet $Mg_{12}$ (in FIG. 8) and raises the mirror and then causes the shutter front screen to run. When the shutter front screen starts to run, the shutter time control circuit 229 starts counting of the shutter time on the basis of the signals from the count starting switches $S_{11}$ (in FIG. 8). Meanwhile, when the shutter front screen runs, the switch $S_{15}$ becomes "off" so that the circuit portion corresponding to the self-hold circuit 226 in FIG. 8 becomes "off" and thus the exposure control circuit 227 and the release mechanism driving circuit 228 become "off." When the shutter time control circuit 229 completes counting of a predetermined shutter time, the magnet $Mg_{11}$ (in FIG. 8) for the running of the rear screen becomes "on" and causes the rear screen to run.

Thereby, the switch $S_{12}$ becomes "off," and thus the circuit portion corresponding to the self-hold circuit 226' in FIG. 8 becomes "off," so that the shutter time control circuit 229 becomes "off." At this time, the "off" signal of the switch $S_{12}$ is transferred to the electric driving device 202 through the terminals $t'_4$, $t_4$, and in the electric driving device 202, the transistor $Tr_8$ changes from "on" to "off" because its base potential lowers from the potential of the power source $E_1$ on the camera side to zero. Therefore, when the switch $S_{18}$ is "off," (namely in case of continuous photographing C), both the transistors $Tr_9$ and $Tr_{11}$ become conductive, so that current is passed to the motor $M_1$ to effect shutter charge and film winding operations.

Also, as the base potential of the transistor $Tr_{12}$ lowers from the potential of the power source $E_1$ on the camera side to zero according to the "off" signal of the switch $S_{12}$, the transistor $Tr_{12}$ changes from "on" to "off," so that the charging of the condensor $C_3$ is started. In this instance, the time from the turning to "off" of the transistor $Tr_{12}$ and the starting of the condensor charging until the transistor $Tr_{13}$ becomes conductive corresponds to the delay time of the delay circuit 232. However, the delay time is set to be longer than the time required by the normal winding operation as mentioned before in connection with FIG. 8, so that when the winding operation is performed normally, the transistor $Tr_{13}$ becomes conductive in turn the transistor $Tr_{10}$ "on," and the winding operation is completed before the transistor $Tr_{11}$ becomes "off" and the current passage to the motor M is cut, so that the transistor $Tr_{12}$ becomes conductive and the charge in the condensor $C_3$ is discharged before it reaches to a level high enough for making the transistor $Tr_{13}$ conductive.

Meanwhile, when the switch $S_{12}$ becomes "on," the base potential of the transistor $Tr_8$ rises from zero to the potential of the power source $E_1$ on the camera side and the transistor $Tr_8$ becomes conductive so that both the transistors $Tr_9$ and $Tr_{11}$ become "off" to cut the current passage to the motor $M_1$ and simultaneously the transistor $Tr_{14}$, hence the transistor $Tr_{15}$ becomes conductive due to the electromotive force of the motor $M_1$ itself, so that both ends of the motor $M_1$ are short-circuited and the motor is stopped at once.

In this case, if the switch $S_{14}$ or $S_{17}$ is maintained "on," the exposure control circuit 227, the release mechanism driving circuit 228 and the shutter time control circuit 229 start operation to effect shutter release. By repeating the above operations, a continuous photographing is performed.

In case where the switch $S_{18}$ is made "on" (namely the camera is set for a single frame photographing S), the transistor $Tr_{10}$ remains conductive so far as the switch $S_{14}$ or $S_{17}$ is "on" even when the shutter rear screen runs and the switch $S_{12}$ becomes "off," because the transistor $Tr_{10}$ is connected at its base side to the earth side of the power source on the side of the electric driving device through the resistor $R_{25}$, the diode $D_8$, the switch $S_{18}$ and the switch $S_{14}$ or $S_{17}$, so that the motor $M_1$ does not rotate because the transistor $Tr_{11}$ is "off" and the winding operation does not start. The collector and the emitter of the transistor $Tr_{12}$ are shorted and the transistor $Tr_{12}$ is "off" because either of the switches $S_{14}$ and $S_{17}$ is "on," and thus the charging of the condensor $C_3$ does not start and the delay circuit 232 does not operate.

When both the switches $S_{14}$ and $S_{17}$ are made "off," the transistor $Tr_{10}$ becomes "off," so that the transistor $Tr_{11}$ becomes conductive and current passes to the motor $M_5$ to tart the winding operation.

When the switches $S_{12}$, $S_{14}$ and $S_{17}$ are all made "off," the charging of the condensor $C_3$ starts, but in case when the winding operation is performed normally as mentioned above, the winding operation is completed before the transistor $Tr_{13}$ becomes conductive due to the potential of the condensor $C_3$.

When the winding operation is completed the motor $M_1$ stopps in a similar way as in case of the continuous photographing.

Therefore, the switch $S_{14}$ or $S_{17}$ is made "on" the single frame photographing is performed through operations similar to the above.

Further, in case when the winding mechanism stops due to absence of the film, for example, during the winding operation, the transistor $Tr_{13}$ becomes conductive to make conductive the transistor $Tr_{10}$ after the time defined by a C-R time constant circuit composed of the condensor $C_3$ and the resistor $R_{20}$ (namely after the lapse of the delay time of the delay circuit 232), because the charging of the condenser $C_3$ has been started simultaneously with the start of the winding operation, so that the transistor $Tr_{11}$ is turned "off" and the current passage to the motor $M_1$ is cut and the motor $M_1$ is stopped as above mentioned.

FIG. 10 shows a modification of the electric circuit shown in FIG. 9, in which the switch $S_{12}$ is substituted by a change-over switch $S'_{12}$. The same numerical references as in FIG. 9 represents the same members having the same functions as in FIG. 9. $S'_{12}$ is a change-over switch which is connected to the side a while the shutter charge is completed and the shutter rear screen starts running and is connected to the side b while the shutter rear screen starts running and the shutter charge is completed. The terminals $t'_4$ and $t_4$ of the switch $S'_{12}$ on the side b are connected to the base side of the transistor $Tr_9$ through the switch SM' and the resistor $R_{14}$. A transistor $Tr_{16}$ is connected between the base and the emitter of the transistor $Tr_{12}$, and an emission diode $D_{11}$ is connected on the collector side of the transistor $Tr_{13}$.

Explanations will be made on the operational functions of the above circuit (explanations for the same components as in FIG. 9 are omitted).

When the shutter rear screen starts running and the switch $S'_{12}$ is changed over from the side a to the side b, the base potential of the transistor $Tr_9$ rises to the potential of the power souce $E_1$ on the side of the camera body to make the transistor $Tr_9$ conductive, so that the transistor $Tr_{11}$ becomes conductive (however, it is necessary that the switches $S_{14}$ and $S_{17}$ are made "off," or the switch $S_{18}$ is made "off" to maintain the transistor $Tr_{10}$ "off"), and current passes to the motor $M_1$ to start the winding operation. Simultaneously, the charging of the condensor $C_3$ is started just as in case of FIG. 9, but the winding operation is completed before the transistor $Tr_{13}$ is made conductive by the voltage charged in the condensor $C_3$ as mentioned above and the switch $S'_{12}$ is changed over from the side b to the side a, so that the transistor $Tr_{16}$ is turned "off" and the transistor $Tr_{12}$ is turned "on," and thus the charge in the condensor $C_3$ is discharged through the transistor $Tr_{12}$. When the winding operation is completed and the switch $S'_{12}$ is changed over from the side b to the side a, the transistor $Tr_8$ becomes "off," so that the transistor $Tr_{11}$ becomes "off" to cut the current passage to the motor $M_1$ and the motor $M_1$ is stopped at once by the action of the brake circuit.

In case when the winding mechanism is stopped during the winding operation, the switch $S'_{12}$ is maintained to be connected to the side b, so that the transistor $Tr_{16}$ becomes conductive after the time defined by the C-R time constant circuit composed of the condensor $C_8$ and the resistor $R_{20}$, and the transistor $Tr_{10}$ becomes conductive. Thus the motor $M_1$ stops even when the transistor $Tr_{11}$ is turned "off." Also when the transistor $Tr_{13}$ becomes conductive, the emission diode $D_{11}$ becomes on to indicate that the winding mechanism is stopped during the winding operation.

The timing at which the safety switch $S_{12}$ becomes "off" and the timing at which the safety switch $S'_{12}$ is changed over from the side a to the side b agree to the time point when the shutter rear screen starts running, so that the turning "off" and change over of the switch is earlier than the time point when the exposure is actually completed (namely, the time point when the shutter rear screen completes its running) by the time required by the running of the shutter rear screen (about 10 ms), so that a delay time longer than the time for the rear screen running is required before the motor $M_1$ starts its rotation after current is passed to the motor $M_1$ by the switching circuit 31. However, the time delay caused at the starting of the motor $M_1$ can be used for the above delay time, and if the time delay longer than the rear screen running time can not be off-set by the time delay at the starting of the motor, a delay circuit such as a C-R delay circuit may be connected between the switching circuit 231 and the motor $M_1$ to absorb the delay time portion which can not be absorbed by the delay circuit. The delay circuit may be used as an interval timer device for changing the photographing intervals.

In the above embodiments, explanations have been made for the case in which the camera body and the electric driving device are separated. However, the camera body and the electric driving device are constructed in a united body.

According to the present invention, the exposure of the camera can be determined by the shutter time preference system and the release can be effected by the magnetic release, so that the shutter release can be made only by turning the switch "on" and the pushdown of the release button is relieved and the handswing at the time of photographing is prevented, and the shutter release operation can be done with wide variation such that the release button is arranged for a vertical photographing or a horizontal photographing and that a wire or wireless remote photographing and can be easily performed.

Further, according to the present invention, the camera has an input member such as the electric driving device for the shutter release, the shutter release operation from outside made be done only by adding the signal to the above input member and no complicated outside release device as required conventionally is required so that the structure can be simplified with great advantage. Further according to the present invention, sending and receipt of signals between the camera body and the attachment can be effected contactless, so that the attachment unit can be attached to the camera body very easily, and the time from the shutter release to the shutter driving can be shortened and thus quick photographing can be assured.

Also in case of a camera in which the release is done by a magnetic means, it is possible to provide a safety switch which prohibits the shutter release during the winding operation and cuts the power supply to the shutter release circuit during the winding operation, so that it is possible to control accurately the shutter release and the winding alternately.

Further, according to the present invention, the safety switch is designed so as to operate in association with the movement of the shutter rear screen, it is not necessary to provide separately a detecting means only for detecting the winding completion as well as a detecting means for detecting the exposure completion. Therefore, the size of the electric driving device can be minimized and the manufacturing cost can be reduced.

Further, according to the embodiments of the present invention, the delay circuit starts to operate in synchronism with the start of the winding operation, and if the winding operation is not completed even after the lapse of a predetermined time, the motor stops even if the switching circuit becomes "off" due to the action of the delay circuit, so that it is possible to prevent the trouble of the motor and the winding mechanism due to sudden changes during the winding operation, and further in the embodiment shown in FIG. 10 occurrence of sudden changes can be indicated and thus great advantage is assured.

Still further, the electrical driving of the camera can be effected either by the release means on the camera side or by the release means on the side of the electric driving device, the camera operation is improved.

What is claimed is:
1. A shutter time preference single lens reflex camera having an electric driving device, which comprises in combination;
   1. a camera body having,
      a. a photographing lens having a diaphragm device,
      b. means for measuring transmitted light of the photographing lens,
      c. photographing information setting means having shutter time setting means,
      d. computation means for computing the output of the photometric means and the output of the photographing information setting means,
      e. diaphragm control means for controlling the operation of the diaphragm device, which means determines the diaphragm aperture of the diaphragm device in correspondence to the output computation of the computation means,
      f. time control means for controlling shutter time in correspondence to the value set by the shutter time setting means,
      g. means for actuating the diaphragm control means and the time control means, which starts the time control means after the start of the diaphragm control means,
      h. magnetic release means for driving the actuating means,
      i. a first switching means for controlling conductivity of the magnetic release means,
      j. operation means for controlling "on" and "off" of the switching means,
      k. film winding means for charging the time control means and the diaphragm control means, and
      l. a second switching means for controlling conductivity of the time control means, the diaphragm control means and the magnetic release means, which second switching means is made "off" by the completion of the operation of the time control means and is made "on" by the completion of the charge, and
   2. an electric driving device comprising,
      a. winding driving means which engages with the winding means,
      b. control means for controlling the winding driving of the driving means, which control means operates while the second switching means is "off," and does not operate while the second switching means is "on," and
      c. a third switching means connected in parallel to the first switching means, which controls conductivity of the magnetic release means.

2. A shutter time preference single lens reflex camera attachable with an electric driving device comprising:
   a photographing lens having a diaphragm device;
   photometric means for measuring transmission light of the photographing lens;
   means for setting photographing information having means for setting shutter time;

means for computing the output of the photometric means and output of the photographing information setting means;

diaphragm control means for controlling the operation of the diaphragm device, which determines the aperture of the diaphragm device, in correspondence to the output computation of the computing means;

means for controlling the shutter time in correspondence to the value set by the shutter time setting means;

means for actuating the diaphragm control means and the time control means;

a magnetic release means for driving the actuating means;

a first switching means for controlling conductivity of the magnetic release means;

operation means for controlling the "on" and "off" states of the switching means;

a film winding-up means, said means being functional for charging said time control means as well as said diaphragm control means;

a second switching means for controlling the drive of an electric driving device, said means being functional for maintaining said device under the first state wherein said device is maintained in a driving condition during the period between the completion of operation and the completion of charging of said time control means and also for maintaining said electric driving device under the second state wherein said device is maintained inoperative during the period between the completion of charging and the completion of operation of said time control means;

means for transmitting the first and the second states of said second switching means to said electric driving device, said transmitting means being provided with a terminal to be connected with said device which further comprises a third switching means which is connected in parallel with the first switching means, controls the conductivity of the magnetic release means, and is closed by a release signal from the electric driving device.

3. A camera according to claim 2, in which the third switching means is composed of a relay which is excited by a release signal from the electric driving device and a relay contact which is connected in parallel to the first switching means and is closed when the relay is excited.

4. A shutter time preference single lens reflex camera having an electric driving device, which comprises:
a camera body having,
 a. a photographing lens having a diaphragm device,
 b. means for measuring transmitted light of the photographing lens,
 c. photographing information setting means having shutter time setting means,
 d. computation means for computing the output of the photometric means and the output of the photographing information setting means,
 e. diaphragm control means for controlling the operation of the diaphragm device, which means determines the diaphragm aperture of the diaphragm device in correspondence to the output computation of the computation means,
 f. time control means for controlling shutter time in correspondence to the value set by the shutter time setting means,
 g. means for actuating the diaphragm control means and the time control means,
 h. magnetic release means for driving the actuating means,
 i. a first switching means for controlling conductivity of the magnetic release means,
 j. operation means for controlling "on" and "off" of the switching means,
 k. film winding means for charging the time control means and the diaphragm control means,
 l. a second switching means for controlling the action of said electric driving device, which second switching means changes over to a first position for driving the electric driving device upon completion of the operation of the time control means and changes over to a second position for making non-operative the electric driving device upon completion of charging of the time control means, and
 m. connecting means on the camera body side for connecting the second switching means to the electric driving device, having a terminal on the camera body side connected to the second switching means;
2. an electric driving device comprising:
 a. winding driving means which is engageable with the winding means,
 b. connecting means on the electric driving device side for connecting the second switching means on the camera body side, said connecting means having a terminal on the electric driving side connecting to the terminal on the camera body side, and
 c. control means for controlling the winding driving means, said control means being operative when the terminal on the electric driving device side is connected and the second switching means is changed over to the first position, and being non-operative when the second switching means is changed over to the second position,
and also in which second switching means is a change-over switch for controlling power supply which can be changed over by a movable contact piece between a first contact point which is the first position and a second contact point which is the second position, the first contact point being connected to a wind-up driving control means, and the second contact point being connected to the time control means, the diaphragm control means, and the electromagnetic release means.

5. A shutter time preference single lens reflex camera having an electric driving device, which comprises:
1. a camera body having,
 a. a photographing lens having a diaphragm device,
 b. means for measuring transmitted light of the photographing lens,
 c. photographing information setting means having shutter time setting means,
 d. computation means for computing the output of the photometric means and the output of the photographing information setting means,
 e. diaphragm control means for controlling the operation of the diaphragm device, which means determines the diaphragm aperture of the diaphragm device in correspondence to the output computation of the computation means,
 f. time control means for controlling shutter time in correspondence to the value set by the shutter time setting means, g. means for actuating the diaphragm control means and the time control means, h. magnetic release means for driving the actuating means, i. a first switching means for controlling conductivity of the magnetic release means, j. operation means for controlling "on" and "off" of the switching means, k. film winding means for charging the time control means and the diaphragm control means, l. a second switching means for controlling the action of said electric driving device, which second switching means changes over to a first position for driving the electric driving device upon completion of the operation of the time control means and changes over to a second position for making non-operative the electric driving device upon completion of charging of the time control means, and m. connecting means on the camera body side for connecting the second switching means to the electric driving device, having a terminal on the camera body side connected to the second switching means;

2. an electric driving device comprising:

a. a winding driving means which is engageable with the winding means, b. connecting means on the electric driving device side for connecting the second switching means on the camera body side, said connecting means having a terminal on the electric driving side connecting to the terminal on the camera body side, and c. control means for controlling the winding driving means, said control means being operative when the terminal on the electric driving device side is connected and the second switching means is changed over to the first position, and being non-operative when the second switching means is changed over to the second position, and also in which said electric driving device further comprises a delay circuit which starts to operate upon the change-over of the second switching means to the first position, said circuit being functional for making said wind-up drive control means to be inoperative when the period between completion of operation and completion of charging said time control means is longer than the predetermined time given by said delay circuit.

6. A shutter time preference single lens reflex camera attachable to an electric driving device thereto comprising:

a photographing lens, said lens being provided with a diaphragm device;

photometric means for measuring transmission light of said photographing lens;

means for setting photographing information said means having shutter time setting means;

operation means for computing the output of said photometric means and the output of said photographing information setting means;

diaphragm control means for controlling the action of said diaphragm device, said means being adapted to determine the aperture of said diaphragm device corresponding to the computed value of said operation means;

film winding-up means which charges the shutter time control means and the diaphragm control means;

a second switching means for operating alternatively the electromagnetic release means and the electric driving device, said second switching means being changed over by completion of charging of the time control means to a first state which operates the electromagnetic release means and being changed over by completion of operation of the time control means to a second state which actuates the electric driving device; and means for transmitting the first and second states of the second switching means to the electric driving means, said means having a terminal connected to the second switching means.

diaphragm driving means for driving said diaphragm device, said means being adapted to drive said diaphragm device in correspondence with the diaphragm aperture determined by said diaphragm control means;

means for controlling the shutter time in correspondence to the value set by the shutter time setting means;

a mirror which introduces the transmission light of said photographing lens to a viewfinder;

means for driving said mirror, said means being adapted to cut off the transmission light of said photographing lens from being introduced toward the viewfinder while being adapted to admit the transmission light of said photographing lens to be introduced toward the film surface;

means for actuating said diaphragm control means, the diaphragm driving means, the time control means and the mirror driving means respectively;

single unit electromagnetic means for controlling the action of said actuation means;

a first switching means for controlling the conduction of said electromagnetic means; and means for operating said switching means for controlling the "on" and "off" positions of said switching means;

7. A single lens reflex camera according to claim 6, in which the second switching means is a change-over switch having a first contact point connected to the electro-magnetic release means and a second contact point connected to a terminal.

8. A camera according to claim 6, in which the magnetic release means has a magnet.

9. A camera according to claim 6, which further comprises a memory means which is connected between the computation means and the diaphragm control means and memorizes the output computation of the computation means, and in which the diaphragm control means determines the diaphragm aperture of the diaphragm device.

10. A camera according to claim 9, which further comprises means for indicating the output computation of the computation means, which indicates a diaphragm value.

11. A single lens reflex camera having an electric driving device comprising:

1. a camera body including
   a. a photographing lens having a diaphragm device,
   b. means for measuring transmitted light of the photographing lens,
   c. photographing information setting means, d. computation means for computing the output of the photometric means and the output of the photographing information setting means,
e. exposure control means for controlling the amount of exposure in correspondence to the computed output value by the computation means,
f. diaphragm driving means for driving the diaphragm device,
g. a view finder,
h. a mirror which introduces the transmitted light of the photographing lens to the finder,
i. mirror driving means for driving the mirror which prevents the transmitted light of the photographing lens from being introduced to the finder and introduces it to the film surface,
j. actuation means for actuating the diaphragm driving means and the mirror driving means,
k. magnetic release means for controlling the actuation means,
l. a first switching means for controlling the conductivity of the magnetic release means,
m. operation means for controlling "on" and "off" of the first switching means,
n. film winding means,
o. shutter means,
p. a second switching means for controlling the driving of the electric driving device, which changes over to a first position which drives the electric driving device after the completion of exposure operation of the shutter means, and changes over to a second position which makes non-operative the electric driving device after completion of of the winding action of the film winding means, and
g. means for transmitting switching conditions of the second switching means to the electric driving device, said means having a terminal on the camera body side connected to the second switching means;
2. the electric driving device including:
a. winding driving means engageable with the film winding means,
b. connection means connected to the transmitting means, having a terminal on the electric driving device side connecting to a terminal on the camera body side,
c. means for controlling the winding driving means, which actuates the winding driving means when the second switching means is changed over to the first position, and does not actuate the winding driving means when the second switching means is changed over to the second position; and
d. a delay circuit which starts to operate upon the change-over of the second switching means to the first position, and makes non-operative the winding driving control means when the winding operation is not completed after the lapse of the delay time of the delay circuit.

12. A single lens reflex camera according to claim 11 which further includes means for indicating the non-operative state of the winding driving control means caused by the delay circuit.

13. A shutter time preference single lens reflex camera having an electric driving device, which comprises:
1. a camera body having,
a. a photographing lens having a diaphragm device,
b. means for measuring transmitted light of the photographing lens,
c. photographing information setting means having shutter time setting means,
d. computation means for computing the output of the photometric means and the output of the photographing information setting means,
e. diaphragm control means for controlling the operation of the diaphragm device, which means determines the diaphragm aperture of the diaphragm device in correspondence to the output computation of the computation means,
f. time control means for controlling shutter time in correspondence to the value set by the shutter time setting means,
g. means for actuating the diaphragm control means and the time control means,
h. magnetic release means for driving the actuating means,
i. a first switching means for controlling conductivity of the magnetic release means,
j. operation means for controlling "on" and "off" of the switching means,
k. film winding means for charging the time control means and the diaphragm control means,
l. a second switching means for controlling the action of said electric driving device, which second switching means changes over to a first position for driving the electric driving device upon completion of the operation of the time control means and changes over to a second position for making non-operative the electric driving device upon completion of charging of the time control means, and
m. connecting means on the camera body side for connecting the second switching means to the electric driving device, having a terminal on the camera body side connected to the second switching means;
2. an electric driving device comprising:
a. winding driving means which is engageable with the winding means,
b. connecting means on the electric driving device side for connecting the second switching means on the camera body side, said connecting having a terminal on the electric driving side connecting to the terminal on the camera body side,
c. control means for controlling the winding driving means, said control means being operative when the terminal on the electric driving device side is connected and the second switching means is changed over to the first position, and being non-operative when the second switching means is changed over to the second position,
in which said electric driving device further comprises a delay circuit which starts to operate upon the change-over of the second switching means to the first position, said circuit being functional for making said wind-up drive control means to be inoperative when the period between completion of operation and completion of charging said time control means is longer than the predetermined time given by said delay circuit; and
in which said electric driving device further comprises means for indicating inaction of said wind-up drive control means, said indication means being active to indicate when said wind-up drive control means is inoperative due to said relay circuit.

* * * * *